United States Patent

Arita

(10) Patent No.: US 9,612,466 B2
(45) Date of Patent: Apr. 4, 2017

(54) DISPLAY APPARATUS

(71) Applicant: Mitsubishi Electric Corporation, Tokyo (JP)

(72) Inventor: Kenji Arita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/842,500

(22) Filed: Sep. 1, 2015

(65) Prior Publication Data

US 2016/0085111 A1    Mar. 24, 2016

(30) Foreign Application Priority Data

Sep. 19, 2014  (JP) .................................. 2014-190851

(51) Int. Cl.
  *G02F 1/1333*    (2006.01)

(52) U.S. Cl.
  CPC .................. *G02F 1/133308* (2013.01); *G02F 2001/133317* (2013.01); *G02F 2001/133322* (2013.01); *G02F 2001/133331* (2013.01)

(58) Field of Classification Search
  CPC ................................................. G02F 1/133308
  See application file for complete search history.

(56) References Cited

U.S. PATENT DOCUMENTS

2014/0253823 A1* 9/2014 An .......................... G06F 3/041
                                                                    349/12

FOREIGN PATENT DOCUMENTS

JP         2012-173955 A       9/2012
JP         2012-247726 A       12/2012

* cited by examiner

*Primary Examiner* — James Dudek
(74) *Attorney, Agent, or Firm* — Studebaker & Brackett PC (57) ABSTRACT

A display apparatus includes a frame that holds a display module. The display module includes a protective member located on a display surface side of a display panel. The frame has a plane surface opposed to a periphery of the protective member and a side surface opposed to a side surface of the display module. The plane surface of the frame is fixed to the periphery of the protective member through a joining member. The display apparatus has a fixing structure to fix the side surface of the frame to the side surface of the display module.

11 Claims, 7 Drawing Sheets

DISPLAY APPARATUS

BACKGROUND OF THE INVENTION

Field of the Invention

The present invention relates to a display apparatus including a display panel.

Description of the Background Art

Along with the prevalence of electronic information devices in recent years, there has been a widespread proliferation of a display apparatus (hereinafter also referred to as "liquid crystal display apparatus" that includes a rugged protective member located on the front surface of a liquid crystal display (LCD) panel being a display panel.

The glass bonding technique is employed in the majority of liquid crystal display apparatuses in order to meet the object A described below. One example of the object A is to prevent the deterioration of visibility caused by surface reflection of extraneous light. Another example of the object A is to protect the liquid crystal display apparatuses against, for example, impact, intrusion of water, and dust from the outside. The glass bonding mentioned above is the technique for integrating, through transparent resin, the display surface of the liquid crystal display apparatus with the protective member or the touch panel being a transparent member.

The liquid crystal display apparatuses in which the glass bonding technique is employed have, for example, the configuration (hereinafter also referred to as "configuration N") including the protective member that is larger than the display panel (LCD panel), to thereby improve the design of the liquid crystal display apparatuses. The configuration N includes a frame that holds and fixes the protective member and the LCD panel. The frame has the function of dust resistance and water resistance that can be integrated with the design housing of the liquid crystal display apparatus.

Japanese Patent application Laid-Open No. 2012-173955 discloses a technique (hereinafter also referred to as "related art A") for improving dust resistance and water resistance. In particular, according to the related art A, an elastic member is disposed between the periphery of the touch panel and the support such that the elastic member adheres closely to the touch panel and the support. That is, the gap between the touch panel and the support is sealed with the elastic member. This prevents the intrusion of, for example, dust and moisture, into the housing of the electronic device (display apparatus).

However, the related art A presents the following problem. In particular, according to the related art A, the touch panel being the transparent member is held by the undersurface portion (the support) of the housing. Consequently, the housing according to the related art A needs to have many members including the side surface portion and the undersurface portion (the support).

There is a recent trend toward, for example, lightweight display apparatuses. However, the housing according to the related art A needs to have many members, failing to meet the demand for, for example, lightweight display apparatus. For example, the amount of material of the frame included in the display apparatus needs to be reduced in order to achieve the weight reduction of the display apparatus.

SUMMARY OF THE INVENTION

The present invention has an object to provide a display apparatus whose frame can be made of less material.

A display apparatus according to an aspect of the present invention includes a display module that displays a video and a first frame that holds the display module. The display module includes a display panel that has a display surface on which the video is displayed, a second frame that holds the display panel, and a transparent member located on the display surface side of the display panel to cover the display surface of the display panel. The first frame has an opposing plane surface that is a plane surface opposed to a periphery of the transparent member and a frame side surface that is a surface opposed to a side surface of the display module. The opposing plane surface of the first frame is fixed to the periphery of the transparent member through a joining member. The display apparatus has a fixing structure to fix the frame side surface of the first frame to the side surface of the display module.

According to the present invention, the display apparatus includes the first frame that holds the display module. The display module includes the transparent member located on the display surface side of the display panel. The first frame has the opposing plane surface opposed to the periphery of the transparent member and the frame side surface opposed to the side surface of the display module. The opposing plane surface of the first frame is fixed to the periphery of the transparent member through the joining member. The display apparatus has the fixing structure to fix the frame side surface of the first frame to the side surface of the display module.

That is, the frame side surface of the first frame is fixed to the side surface of the display module. Therefore, the first frame does not need to have such a shape extending from the side surface of the display module to the undersurface side of the display module. Thus, the amount of material of the first frame can be reduced. In other words, the amount of material of the frame included in the display can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, the following describes preferred embodiments of the present invention. In the descriptions below, the same reference signs indicate the same constituent components, which holds true for the names and functions thereof. Therefore, detailed descriptions thereof may be omitted.

The dimension, the material, and the shape of each of the constituent components and the relative arrangement thereof illustrated in the preferred embodiments can be appropriately varied depending on the configuration of the apparatus having the present invention applied thereto and on various conditions, and the present invention is not limited to such illustration. The dimension of each constituent component shown in each of the drawings may vary from the actual dimension thereof.

COMPARATIVE EXAMPLE

Figure 9:
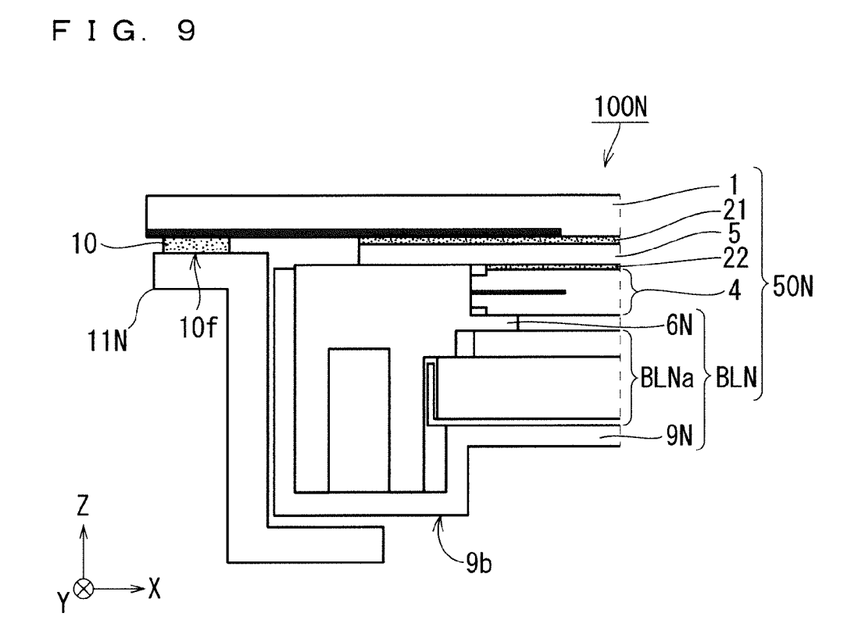
FIG. 9 is a cross-sectional view describing the display apparatus according to a comparison example.

Firstly, the following describes a display apparatus (hereinafter also referred to as "display apparatus 100N") that has the above-described configuration N including a protective member that is larger than the display panel. The display apparatus 100N is the apparatus for comparison with a display apparatus 100 which will be described later. FIG. 9 is a cross-sectional view describing the display apparatus 100N according to an comparison example. With reference to FIG. 9, the display apparatus 100N includes a display module 50N and a frame 11N.

The display module 50N displays a video. The frame 11N holds the display module 50N. The frame 11N is the flange frame located on the peripheral portion of the display apparatus 100N.

Firstly, the configuration of the display module 50N is described. The display module 50N includes a protective member 1, a touch panel 5, a display panel 4, a backlight BLN, a joining member 10, and adhesive materials 21 and 22.

The display panel 4 and the touch panel 5 are joined to each other through the adhesive material 22. The touch panel 5 and the protective member 1 are jointed to each other through the adhesive material 21.

The backlight BLN emits light to the display panel 4. The display panel 4 displays a video through the use of the light emitted by the backlight BLN. The backlight BLN includes a light source module BLNa and frames 6N and 9N.

The frame 9N houses the frame 6N and the light source module BLNa. The frame 6N holds the display panel 4 and the light source module BLNa. The light source module BLNa emits, toward the display panel 4, the light emitted by a light source (not shown).

The frame 11N houses the backlight BLN. The frame 11N is fixed to the periphery of the protective member 1 through the joining member 10. Thus, the frame 11N and the protective member 1 are unified. The surface of the joining member 10 that is in contact with the frame 11N is hereinafter also referred to as "joint interface 10f."

In the display apparatus 100N having the above-described configuration, the backlight BLN has, in some cases, a thickness that is sufficiently greater than the design value as a result of, for example, variations in processing of members included in the backlight BLN. If this is the case, an undersurface 9b of the backlight BLN interferes with the frame 11N. In particular, the undersurface 9b of the backlight BLN puts great stress on the lower part of the frame 11N. This applies stress to the frame 11N in the direction that separates the frame 11N and the joint interface 10f from each other. Consequently, the joining member 10 comes off from the frame 11N. This results in loss of the function of dust resistance and water resistance of the display apparatus 100N.

One of the ideas that would prevent the above-described interference between the undersurface 9b of the backlight BLN and the frame 11N is the configuration (hereinafter also referred to as "configuration Na") providing a wide clearance between the undersurface 9b and the frame 11N. Unfortunately, in the configuration Na, the backlight BLN housed in the frame 11N can move in the thickness direction. Thus, a light leakage is likely to occur between the display panel 4 and the backlight BLN. This causes deterioration of display quality of the video displayed by the display apparatus having the configuration Na applied thereto.

There are various problems, such as the above, concerning the configuration in which the backlight is not fixed to the frame 11N as described above.

The related art A described above has the structure that produces the reaction force against the pressing force applied by the projection on the elastic member. Thus, according to the related art A, for example, a double-sided tape for fixing the bezel is continuously subjected to the stress that would peel off the double-sided tape. Therefore, the related art A is unsuitable for the structure for providing dust resistance and water resistance. That is, the above-described problems cannot be solved through the related art A.

The problems described in the comparative example above are solved through the following preferred embodiments. The preferred embodiments of the present invention are described below with reference to the drawings.

<First Preferred Embodiment>

(Overall Configuration of Display Apparatus)

Figure 1:
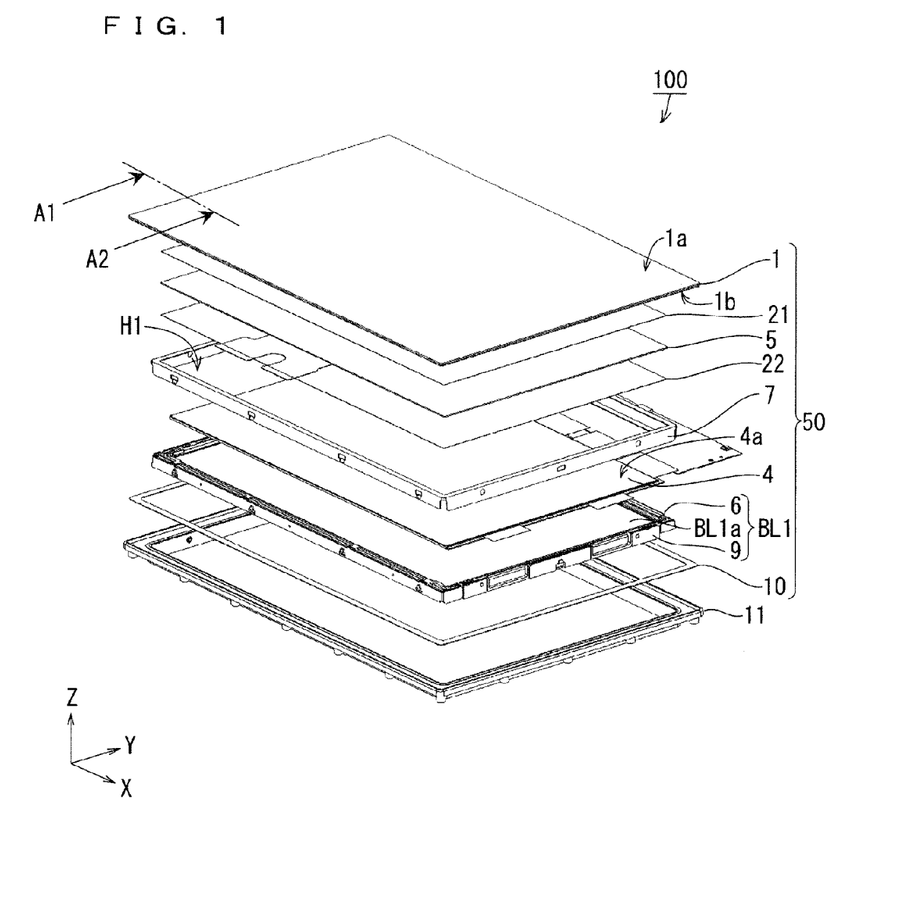
FIG. 1 is an exploded perspective view of a display apparatus according a first preferred embodiment of the present invention.

FIG. 1 is an exploded perspective view of the display apparatus 100 according to the first preferred embodiment of the present invention. The display apparatus 100 is, for example, a liquid crystal display apparatus that displays a video through liquid crystals. The display apparatus 100 is not limited to the liquid crystal display apparatus and may be a display apparatus of another system. The liquid crystal display 100 may be, for example, a plasma display or an organic electroluminescence (EL) display.

The display apparatus 100 is an apparatus in which the glass bonding technique described above is employed. The display apparatus 100 may be another apparatus in which the glass bonding technique is not employed.

In FIG. 1, X, Y, and Z directions are orthogonal to one another. The X, Y, and Z directions indicated in the subsequent drawings are also orthogonal to one another. The direction including the X direction and the direction (−X direction) opposite to the X direction is hereinafter also referred to as "X axis direction." The direction including the Y direction and the direction (−Y direction) opposite to the Y direction is hereinafter also referred to as "Y axis direction." The direction including the Z direction and the direction (−Z direction) opposite to the Z direction is hereinafter also referred to as "Z axis direction."

The plane surface including the X axis direction and the Y axis direction is hereinafter also referred to as "X-Y plane." The plane surface including the X axis direction and the Z axis direction is hereinafter also referred to as "X-Z plane." The plane surface including the Y axis direction and the Z axis direction is hereinafter also referred to as "Y-Z plane."

Figure 2:
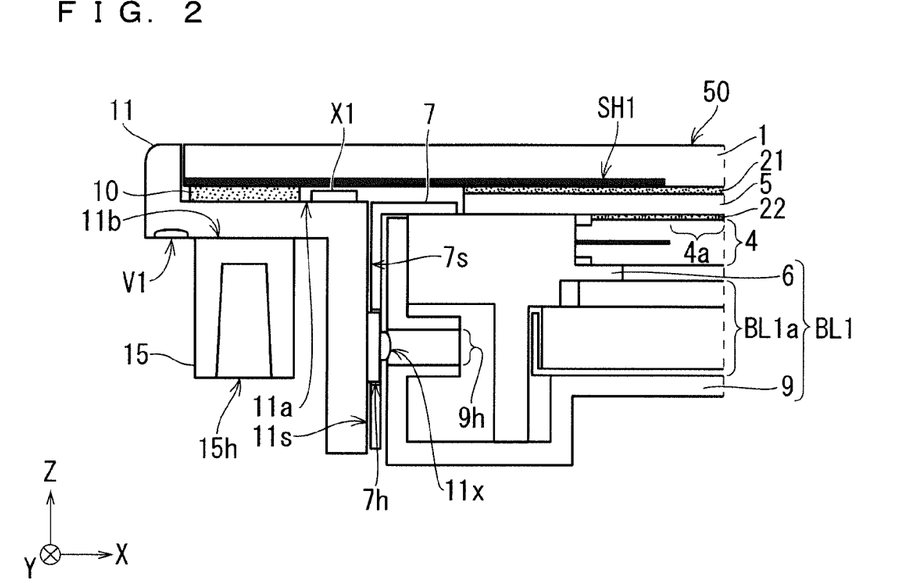
FIG. 2 is a cross-sectional view of the display apparatus according to the first preferred embodiment of the present invention.
Figure 3:
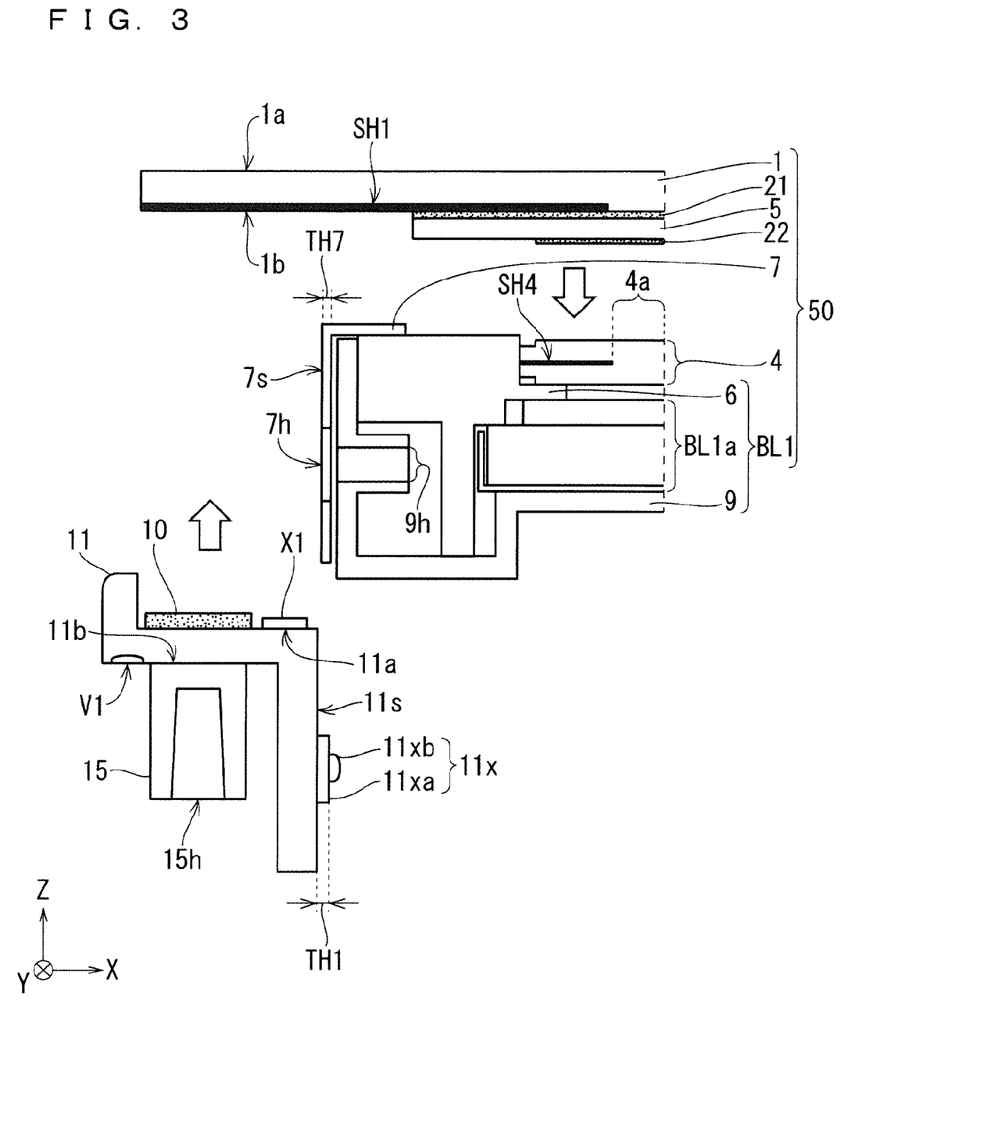
FIG. 3 is an exploded cross-sectional view of the display apparatus according to the first preferred embodiment of the present invention.

FIG. 2 is a cross-sectional view of the display apparatus 100 according to the first preferred embodiment of the present invention. In particular, FIG. 2 is a cross-sectional view of the assembled display apparatus 100 taken along the line A1-A2 in FIG. 1. FIG. 3 is an exploded cross-sectional view of the display apparatus 100 according to the first preferred embodiment of the present invention.

With reference to FIGS. 1, 2, and 3, the display apparatus 100 includes a display module 50 and a frame 11.

The display module 50 displays a video. The frame 11 holds the display module 50. The frame 11 has, in plan view (in the X-Y plane), a closed loop shape, or equivalently, a frame shape. The frame 11 is the flange frame located on the peripheral portion of the display apparatus 100. The frame 11 will be described later in detail.

The display module 50 includes the protective material 1, the touch panel 5, a frame 7, the display panel 4, a backlight BL1, the joining member 10, and the adhesive materials 21 and 22. The following describes each of the above members included in the display apparatus 100.

(Display Panel)

The display panel 4 is the panel that displays a video through the use of the light emitted by the backlight BL1. The display panel 4 includes a display surface 4a on which a video is displayed. The display panel 4 includes a light-shielding member SH4 sitting in an area other than the display surface 4a (see FIG. 3).

The display panel 4 is, for example, a liquid crystal panel. The liquid crystal panel is the panel making use of the birefringence of the liquid crystal material. The liquid crystal panel includes a color filter substrate, a TFT substrate, a spacer, a sealing material, a liquid crystal layer, an alignment film, and a polarizing plate.

Each of the color filter substrate and the TFT substrate is an insulating substrate made of, for example, glass. The color filter substrate is the substrate having, for example, a colored layer (color filter), a light-shielding layer, a counter electrode formed thereon. The TFT substrate is the substrate having, for example, a pixel electrode including a thin transistor formed thereon. The thin transistor is hereinafter also referred to as "thin film transistor (TFT)." The TFT is the switching element located on the substrate.

The color filter substrate and the TFT substrate are placed face-to-face. The spacer is placed to provide a predetermined gap between the color filter substrate and the TFT substrate. The sealing material is the member that bonds the color filter substrate and the TFT substrate together.

The liquid crystal layer is sandwiched between the color filter substrate and the TFT substrate. The liquid crystal layer is the layer formed of liquid crystals. In the display panel 4, a sealant is provided in the inlet through which liquid crystals are injected into the liquid crystal layer. The alignment film is the film that aligns liquid crystals included in the liquid crystal layer. The polarizing plate transmits only the light oscillating in a particular direction.

The display panel 4 is not limited to the liquid crystal panel and may be a panel of another system. The display panel 4 may be, for example, a plasma panel in which the plasma technique is employed.

(Backlight)

The backlight BL1 emits light to the back surface of the display panel 4 (in the Z direction). The backlight BL1 includes a light source module BL1a and frames 6 and 9. The light source module BL1a includes a light source (not shown) and a light guide panel. The light source emits light. The light guide panel has the function of propagating light. The light guide panel guides the light emitted by the light source in a particular direction (in the Z direction).

The frame 9 is the rear frame located on the rear surface of the display apparatus 100. The frame 9 is substantially shaped in a box having an opening. The frame 9 houses the frame 6 and the light source module BL1a. The frame 9 will be described later in detail.

The frame 6 is the mold frame. The frame 6 has, in plan view (in the X-Y plane), a closed loop shape, or equivalently, a frame shape. The frame 6 holds the display panel 4 and the light source module BL1a. The frame 6 will be described later in detail.

(Touch Panel)

The touch panel 5 includes a transparent substrate and a circuit having a transparent electrode formed on the transparent substrate. The touch panel 5 converts the information on position coordinates input from the outside (by the user) into electrical signals through the above circuit. Then, the touch panel 5 transfers the electrical signals to the control circuit (not shown) of the end product through the output wiring portion connected with the end of the touch panel 5.

The touch panel 5 according to this preferred embodiment is a projected capacitive touch panel. The touch panel 5 detects the position (hereinafter also referred to as "contact position") that comes in contact with, for example, a fingertip of the operator. The touch panel 5 measures the ratio of the amount of current arising from a plurality of electrode patterns at the contact position and in the vicinity of the contact position. Consequently, the touch panel 5 precisely specifies the position of the finger and receives an input of a signal corresponding to the position of the finger.

The touch panel 5 is the transparent member made of a transparent material. The transparent material is, for example, glass or plastic. In particular, the upper part and the lower part of the touch panel 5 each include a substrate. The substrate is made of, for example, transparent glass.

(Protective Member)

The protective member 1 is the member that protects the touch panel 5 and the display panel 4 against damage, deformation, abrasion, soiling, and the like resulting from, for example, application of force and contact from the outside. The protective member 1 is the transparent member made of a transparent material. The transparent material is, for example, glass or plastic.

The protective member 1 has, for example, a plate shape. The protective member 1 includes a main surface 1a and a back surface 1b. The back surface 1b is the surface of the protective member 1 opposite to the main surface 1a. The protective member 1 includes a light-shielding member SH1 sitting in an area other than a display surface 4a.

The protective member 1 according to this preferred embodiment is, as an example, made of glass that has high strength and is resistant to deformation. The protective member 1 is thicker than the touch panel 5. The protective member 1 is, for example, twice or more than twice as thick as the touch panel 5. This prevents the deformation of and the damage to the touch panel 5, the display panel 4, and the like.

The protective member 1 being the transparent member is located on the display surface 4a side of the display panel 4 to cover the display surface 4a of the display panel 4. In particular, the protective member 1 is located over the touch panel 5 sitting over the display panel 4.

The display module 50 may have a configuration (hereinafter also referred to as "modified configuration A") that does not include the touch panel 5. According to the modified configuration A, the protective member 1 is located over the display surface 4a of the display panel 4.

The front surface or the back surface of the protective member 1 may be subjected to, for example, printing and coating work. This provides the protective member 1 with the function as the design member.

(Frame)

The frame 7 is the front frame located on the anterior surface side of the display apparatus 100. The frame 7 has, in plan view (in the X-Y plane), a closed loop shape, or equivalently, a frame shape. The frame 7 has an opening H1.

The frame 7 holds the display panel 4. In particular, the frame 7 holds the display panel 4 with the frames 9 and 6 located therebetween (see FIG. 2). The frame 7 holds the backlight BL1 with the frames 9 and 6 located therebetween. The frame 7 includes, for example, a thin-plate metal and a resin molded article. The frame 7 is formed into one piece. The frame 7 may be formed by combining a plurality of members.

The frame 7 has a side surface 7s. The side surface 7s is equivalent to the outer periphery surface of the frame 7. The side surface 7s is the side surface of the display module 50. The side surface 7s is hereinafter also referred to as "frame side surface." That is, the frame 7 has the frame side surface that is the side surface of the display module 50.

With reference to FIGS. 2 and 3, the frame 9 is engaged with the side surface of the frame 6 via, for example, an engaging portion (not shown). The engaging portion is, for example, a craw. The engaging part is provided on one of or both of the frame 9 and the frame 6.

With reference to FIGS. 2 and 3, the frame 7 is engaged with the side surface (the outer periphery surface) of the frame 9 (the backlight BL1) via, for example, an engaging portion (not shown). The engaging portion is, for example, a claw. The engaging portion is provided on one of or both of the frame 7 and the frame 9. The frame 7 is engaged with the frame 9, and thus, the frame 7 and the frame 9 hold the display panel 4, the backlight BL1, and the like.

The side surface portion of the frame 9 has a hole 9h through which the frame 9 is fastened with a screw. The frame 9 does not necessarily have the hole 9h.

The frame 11 holds the display module 50 as described above. The display module 50 includes the display panel 4, the touch panel 5, the frame 7, and the protective member 1 as described above. That is, the frame 11 holds the display panel 4, the touch panel 5, the frame 7, the protective member 1, and the like.

The frame 11 is made of resin through molding process. The molding process is, for example, the injection molding. The frame 11 may be made of a material other than resin. The frame 11 may be made of, for example, a metal having high stiffness through molding process. The metal is, for example, magnesium.

(Adhesive Material)

The adhesive materials 21 and 22 are the members that join the display panel 4, the touch panel 5, and the protective member 1 together. The adhesive material 22 is the member that joins the display panel 4 and the touch panel 5 together. That is, as shown in FIG. 2, the display panel 4 and the touch panel 5 are joined together through the adhesive material 22.

The adhesive material 21 is the member that joins the touch panel 5 and the protective member 1 together. That is, as shown in FIG. 2, the touch panel 5 and the protective member 1 are joined together through the adhesive material 21.

According to the above-described modified configuration A in which the display module 50 does not include the touch panel 5, the display panel 4 and the protective member 1 are joined together through, for example, the adhesive material 22.

The adhesive materials 21 and 22 have the index of refraction that is equal to that of the touch panel 5 and the protective member 1 being the transparent members. This eliminates the reflection on the surface between each member, thereby preventing the deterioration of visibility caused by the surface reflection of extraneous light.

The adhesive materials 21 and 22 are provided to protect the display apparatus 100 against, for example, impact, intrusion of water, and dust from the outside of the display apparatus 100 (the display module 50). The adhesive materials 21 and 22 each have a sheet shape. The adhesive materials 21 and 22 do not necessarily have a sheet shape. The adhesive materials 21 and 22 may be, for example, members having flowability. If this is the case, the adhesive materials 21 and 22 are made of curable resin. The curable resin is the resin that can be cured by, for example, ultraviolet (UV) rays or heat.

(Joining Member)

The joining member 10 has, in plan view (in the X-Y plane), a closed loop shape, or equivalently, a frame shape. The joining member 10 is the member having adhesiveness. The joining member 10 is, for example, a double-sided tape or an adhesive compound. The joining member 10 has the waterproofing function. The joining member 10 also has cushioning properties (resilience).

The joining member 10 may include, for example, a double-sided tape or an adhesive compound disposed on a buffer member having the waterproofing function and the cushioning properties. The joining member 10 may be made of curable resin whose adhesiveness is increased with the passage of time. This can further improve the adhesiveness.

(Characteristic Configuration)

Figure 4:
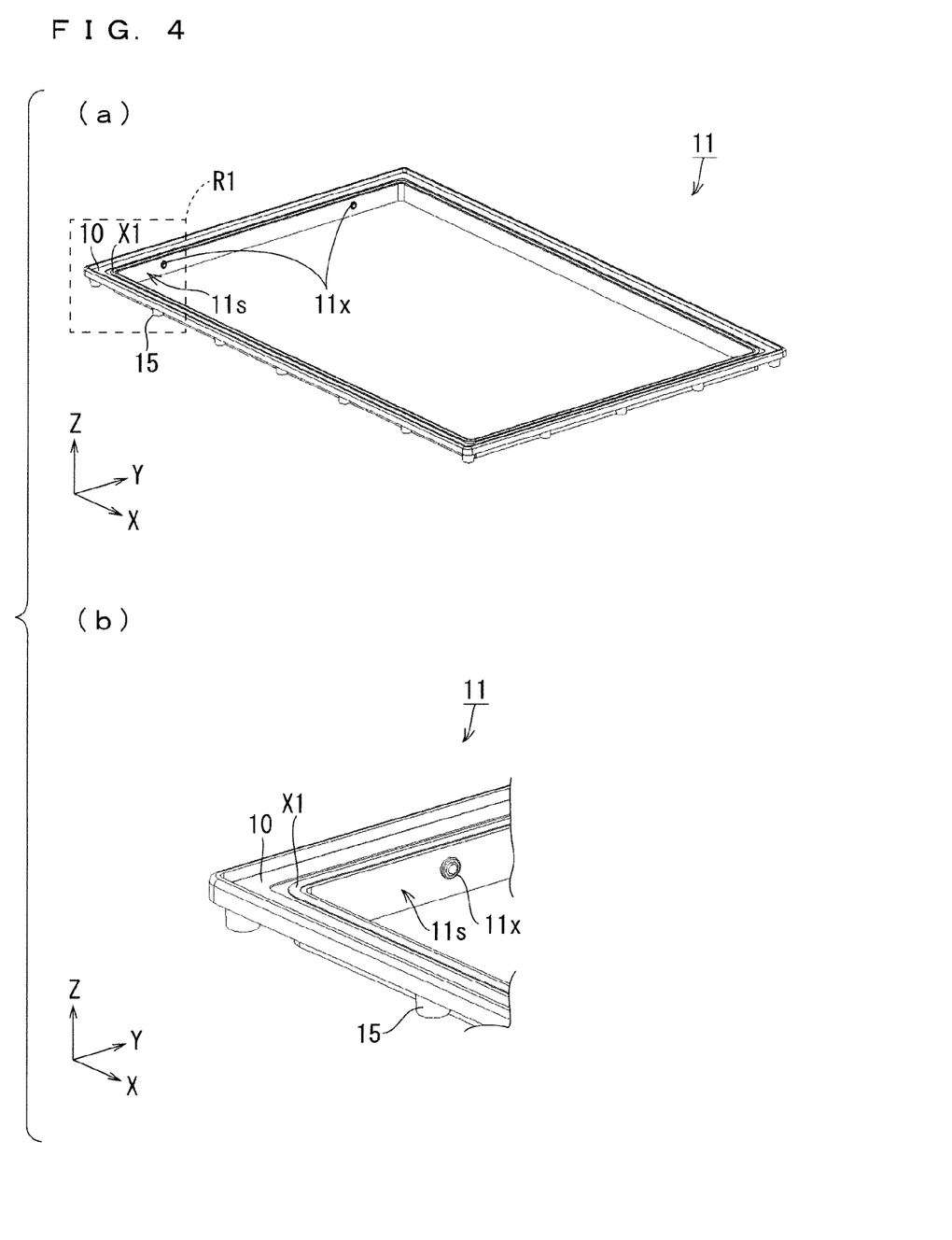
FIG. 4 is a view describing a detailed configuration of a flange frame.

Next, the characteristic configuration in this preferred embodiment is described in detail. FIG. 4 is a view describing the detailed configuration of the frame 11 being the flange frame. Part (a) in FIG. 4 is a perspective view showing the entirety of the frame 11. Part (b) in FIG. 4 is an enlarged view of a region R1 in part (a) in FIG. 4. With reference to FIGS. 2, 3, and 4, the frame 11 has a window frame shape covering the side surface of the display module 50 (the side surface 7s of the frame 7).

The frame 11 has a plane surface 11a, a back surface 11b, and a side surface 11s. The plane surface 11a has, in plan view (in the X-Y plane), a closed loop shape, or equivalently, a frame shape. The plane surface 11a is opposed to the periphery of the protective member 1 that is the transparent member. In particular, the plane surface 11a is opposed to the periphery of the back surface 1b of the protective member 1. The plane surface 11a is parallel to the X-Y plane and the display surface 4a. The plane surface 11a is hereinafter also referred to as "opposing plane surface."

As shown in FIG. 2 and part (b) in FIG. 4, the joining member 10 is located on the plane surface 11a. The plane surface 11a (the opposing plane surface) of the frame 11 is fixed to the periphery of the protective member 1 being the transparent member through the joining member 10. In particular, the periphery of the back surface 1b of the protective member 1 and the plane surface 11a (the opposing plane surface) are joined together through the joining member 10. Thus, the protective member 1 and the frame 11 are unified.

The back surface 11b is the surface of the frame 11 opposite to the plane surface 11a (the opposing plane surface). The plane surface 11b is parallel to the X-Y plane and the display surface 4a.

The side surface 11s is the inner surface of the frame 11. The side surface 11s is opposed to the side surface of the display module 50 (the side surface 7s of the frame 7). The side surface 11s is hereinafter also referred to as "frame side surface."

The display apparatus 100 has a fixing structure STa to fix the frame side surface (the side surface 11s) of the frame 11 to the side surface of the display module 50 (the side surface 7s of the frame 7).

Next, the fixing structure STa is described. With reference to FIGS. 2, 3, and 4, the frame side surface (the side surface 7s) of the frame 7 has a hole 7h. That is, the frame 7 has the hole 7h. In the Y-Z plane, the hole 7h is located at the same position as that of the hole 9h described above. The frame 7 may have a plurality of holes 7h in a surface other than the surface opposed to the hole 9h.

The side surface 1 is (the frame side surface) of the frame 11 has a projecting portion 11x. The projecting portion 11x is the structure to be inserted into the hole 7h. The projecting portion 11x is formed through the molding process described above.

The fixing structure STa is the structure to fix the frame 11 to the frame 7 by inserting the projecting portion 11x into the hole 7h as shown in FIG. 2. The frame 11 is positioned relative to the frame 7 through the fixing structure STa.

The projecting portion 11x has a two-layer structure. In particular, the projecting portion 11x is composed of a member 11xa and a member 11xb. The members 11xa and 11xb each have a cylindrical shape. The member 11xb is located on the member 11xa.

The portion of the frame 7 in which the hole 7h is provided is hereinafter also referred to as "hole presence portion." The hole presence portion is the portion of the frame 7 in which the side surface 7s is present.

With reference to FIG. 3, a thickness TH1 of the member 11xa is equal to a thickness TH7 of the hole presence portion of the frame 7. The description "the thickness TH1 is equal to the thickness TH7" herein also means that the thickness TH1 is substantially equal to the thickness TH7. For example, the thickness TH1 may be 0.8 times to 1.2 times as large as the thickness TH7.

The projecting portion 11x does not necessarily have the two-layer structure and may have a monolayer structure. The projecting portion 11x of the monolayer structure includes, for example, only the member 11xa.

The following describes the configuration to suppress the occurrence of display unevenness. With reference to FIGS. 2 and 3, the plane surface 11a (the opposing plane surface) of the frame 11 has a projection X1 projecting toward the protecting member 1 (the transparent member). As shown in FIG. 4, the projection X1 has, in plan view (in the X-Y plane), a closed loop shape, or equivalently, a frame shape. The projection X1 is the member that keeps the amount of compression (collapse) of the joining member 10 at or below a certain amount. In particular, the projection X1 is the member that keeps, at or below a predetermined amount, the amount of compression of the joining member 10 in the Z axis direction resulting from the stress applied to the protective member 1 in the −Z direction. The projection X1 has elasticity. The projection X1 has a height that is smaller than the thickness of the joining member 10. The projection X1 is formed through the molding process described above.

Assume that another configuration (hereinafter also referred to as "configuration NX") does not include the projection X1. Suppose the protective member 1 of the display apparatus 100 having the configuration NX applied thereto is pressed firmly in the −Z direction from the outside (by the operator). In this case, the joining member 10 is compressed in the Z axis direction. Consequently, excessive stress is applied to the display panel 4, causing display unevenness.

Meanwhile, the presence of the projection X1 can prevent the occurrence of display unevenness. The height of the projection X1 is set to fall within the range where display unevenness does not occur. The height of the projection X1 has a value that is, for example, 0.9 times to 0.3 times as large as the thickness of the joining member 10.

Figure 5:
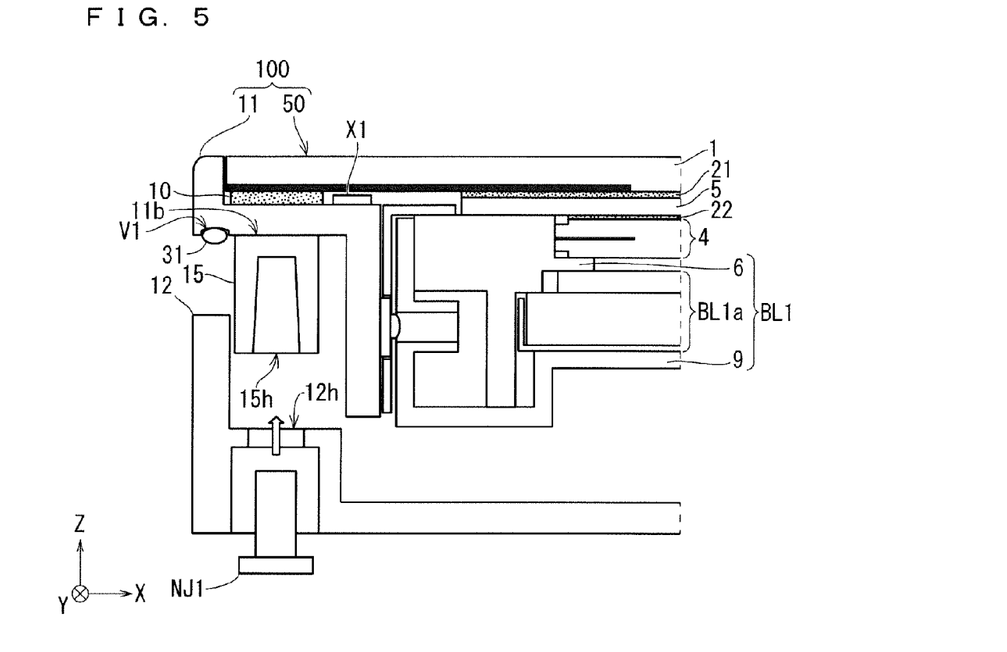
FIG. 5 is a cross-sectional view showing a process of fixing the display apparatus according to the first preferred embodiment of the present invention to a housing.
Figure 6:
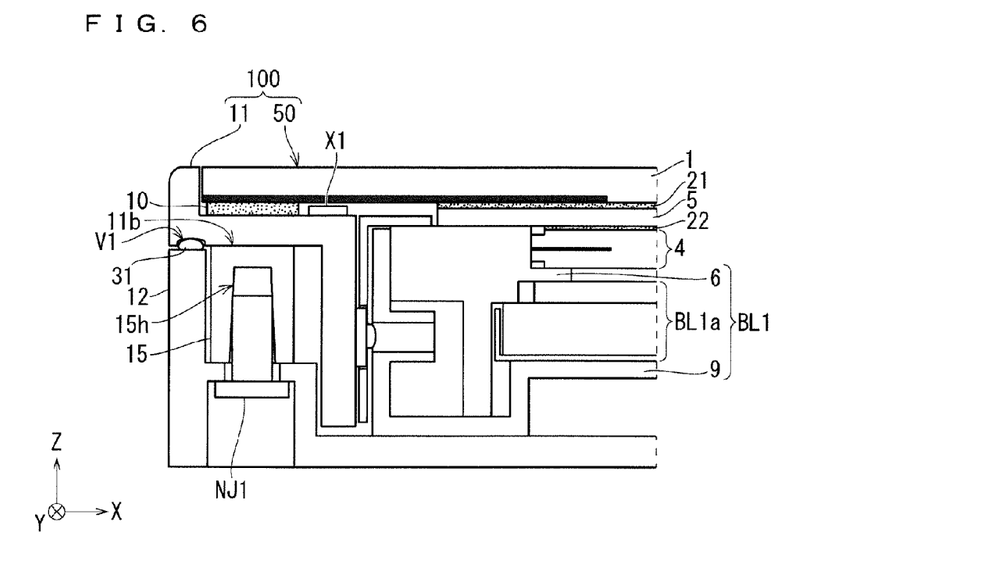
FIG. 6 is a cross-sectional view showing a configuration in which the display apparatus according to the first preferred embodiment of the present invention is fixed to the housing.

The following describes the configuration for fixing (fitting) the display 100 to an exterior housing 12. FIG. 5 is a cross-sectional view showing the process of fixing the display apparatus 100 according to the first preferred embodiment of the present invention to the housing 12. FIG. 6 is a cross-sectional view showing a configuration in which the display apparatus 100 according to the first preferred embodiment of the present invention is fixed to the housing 12.

With reference to FIGS. 2 to 6, a rod-shaped portion 15 is located on the back surface 11b of the frame 11. The rod-shaped portion 15 has a hole 15h being a screw hole. The hole 15h is the hole through which a screw NJ1 described below is inserted to fix the frame 11 (display apparatus 100) to the exterior housing 12.

The back surface 11b of the frame 11b has a groove V1 in its periphery. The groove V1 is the groove for fixing the frame 11 to the exterior housing 12 through a curable resin 31.

The curable resin 31 is used to provide the display apparatus 100 with dust resistance and water resistance. The curable resin 31 is the resin that can be cured by heat. The curable resin 31 may be the resin that can be cured by a factor other than heat. The curable resin 31 may be, for example, a resin that can be cured by ultraviolet irradiation.

With reference to FIG. 3, the following describes the method for assembling the display apparatus 100. Firstly, the touch panel 5 and the protective member 1 are joined together through the adhesive material 21. The module including the touch panel 5 and the protective member 1 that are joined together is hereinafter also referred to as "module A1." The module including the backlight BL1 and the display panel 4 that are held by the frame 7 is hereinafter also referred to as "module B1."

Next, the adhesive material 22 is applied to the back surface of the touch panel 5 of the module A1. Then, the module A1 is turned upside down such that the touch-panel-5 side of the module A1 faces up. Subsequently, the reversed module B1 is fixed to the reversed module A1 by, for example, a positioning jib and an assembly apparatus. In particular, the module B1 is fixed to the module A1 such that the touch panel 5 of the module A1 and the display panel 4 of the module B1 are connected to each other through the adhesive material 22. Consequently, the display module 50 is formed.

Next, a fixing process is performed to fix the frame 11 shown in FIG. 3 to the reversed display module 50. In the fixing process, the plane surface 11a of the frame 11 (the joining member 10) is fixed to the periphery of the protective member 1 such that the projecting portion 11x of the frame 11 is inserted into the hole 7h of the side surface 7s of the frame 7. The fixing process is performed in a state where the periphery of the frame 11 is evenly pressurized. The fixing processing completes the assembly of the display apparatus 100.

With reference to FIGS. 5 and 6, the following describes the method for fixing the display apparatus 100 to the housing 12. The housing 12 is the housing having the waterproofing function. The shape of the housing 12 shown in FIGS. 5 and 6 is an example. The housing 12 is shaped as appropriate in accordance with the requirement of dust resistance and water resistance.

The housing 12 has a hole 12h into which the screw NJ1 is inserted. The NJ1 is a waterproof screw having the waterproofing function.

Firstly, the display apparatus 100 is turned upside down. Then, the curable resin 31 is applied to the groove V1 of the frame 11 included in the display apparatus 100 by, for example, a dispenser apparatus.

Next, the housing 12 is overlaid on the rear surface of the display apparatus 100. Then, the screw NJ1 is inserted into the hole 12h and the hole 15h such that the housing 12 is connected to the display apparatus 100. That is, the screw NJ1 fastens and fixes the housing 12 and the display apparatus 100 together.

Next, the curable resin 31 is subjected to heat. Consequently, the curable resin 31 is cured. This completes the fixation of the housing 12 and the display 100 as shown in FIG. 6. That is, the frame 11 is fixed to the housing 12 through the curable resin 31 applied to the groove V1. The above configuration including the curable resin 31 and the groove V1 can improve the airtightness of the display apparatus 100.

As described above, according to this preferred embodiment, the display apparatus 100 includes the frame 11 that holds the display module 50. The display module 50 includes the protective member 1 located on the display-surface-4a side of the display panel 4. The frame 11 includes the plane surface 11a opposed to the periphery of the protective member 1 and the side surface 11s opposed to the side surface of the display module 50. The plane surface 11a of the frame 11 is fixed to the periphery of the protective member 1 through the joining member 10. The display apparatus 100 has the fixing structure to fix the side surface 11s of the frame 11 to the side surface of the display module 50.

That is, the side surface 11s of the frame 11 and the side surface of the display module 50 are fixed to each other. Therefore, the frame 11 does not need to have such a shape extending from the side surface of the display module 50 to the undersurface side of the display module 50. Thus, the amount of material of the frame 11 can be reduced. In other words, the amount of material of the frame included in the display 100 can be reduced.

According to this preferred embodiment, owing to the above-described configuration, the frame 11 does not need to have such a shape extending from the side surface of the display module 50 to the undersurface side of the display module 50. This can reduce the thickness of the display apparatus 100.

As described above, in the display apparatus 100N according to the comparative example, the backlight BLN has, in some cases, a thickness that is sufficiently greater than the design value as a result of variations in processing of members included in the backlight BLN. If this is the case, the undersurface 9b of the backlight BLN interferes with the frame 11N. In particular, the undersurface 9b of the backlight BLN puts great stress on the lower part of the frame 11N. This applies stress to the frame 11N in the direction that separates the frame 11N and the joint interface 10f from each other. Consequently, the joining member 10 comes off from the frame 11N. This results in loss of the function of dust resistance and water resistance of the display apparatus 100N.

As described above, one of the ideas that would prevent the interference between the undersurface 9b of the backlight BLN and the frame 11N is the configuration Na providing a wide clearance between the undersurface 9b and the frame 11N. Unfortunately, in the configuration Na, the backlight BLN housed in the frame 11N can move in the thickness direction because the backlight BLN is not fixed.

Meanwhile, the fixing structure STa according to this preferred embodiment positions and fixes the projecting portion 11x of the frame 11 to the hole 7h of the frame 7. Thus, the accuracy in processing the frame 7 by itself is all that is required to be considered. This can remarkably improves the accuracy of the fitting position of the frame 11 in relation to the display module 50. This configuration is unaffected by the thickness of the backlight BL1 resulting from variations in processing of members included in the backlight BL1, thereby preventing the joining member 10 from coming off. This provides the excellent dust resistance and water resistance with stability.

In the display apparatus 100 according to this preferred embodiment, the frame 7 is, as described above, engaged with the side surface of the frame 9 of the backlight BL1 via, for example, the engaging portion (not shown) such as a claw. That is, the backlight BL1 and the frame 7 are fixed to each other with increased firmness in the display apparatus 100 as compared to the display apparatus 100N according to the comparative example. Thus, in the display apparatus 100, the backlight BL1 is prevented from moving in the thickness direction. In addition, the display apparatus 100 can prevent the problems of, for example, light leakage.

Thus, this preferred embodiment can provide the display apparatus 100 having the excellent dust resistance and water resistance.

Although the joining member 10 is located between the protective member 1 and the frame 11 according to this preferred embodiment, the joining member 10 may be located in other parts. For example, the joining member 10 may be located between the protective member 1 and the frame 7 and/or between the display panel 4 and the backlight BL1.

<Modification of First Preferred Embodiment>

Figure 7:
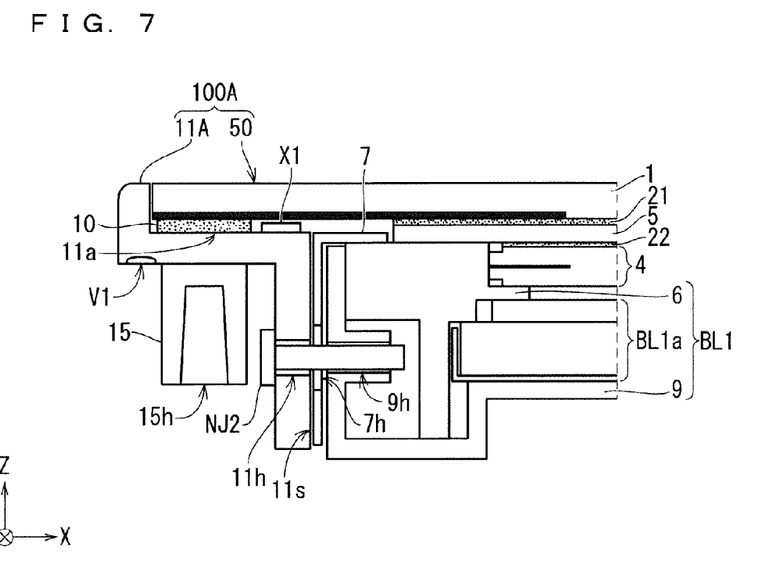
FIG. 7 is a cross-sectional view of the display apparatus according to a modification of the first preferred embodiment of the present invention.

According to a modification of this preferred embodiment, the following describes a display apparatus 100A having a fixing structure STb in place of the fixing structure STa. The fixing structure STb, which will be described later in detail, is the structure to fix the frame 11 to the frame 7 by inserting a screw NJ2 described below into a hole 11h of the frame 11 and the hole 7h of the frame 7.

FIG. 7 is a cross-sectional view of the display apparatus 100A according to the modification of the first preferred embodiment of the present invention. With reference to FIG. 7, the display apparatus 100A differs from the display apparatus 100 in that the display apparatus 100A includes a frame 11A in place of the frame 11. The configuration of the display apparatus 100A except for the above is similar to that of the display apparatus 100, and the detailed description thereof is not repeated.

The frame 11A differs from the frame 11 in that the frame 11A further has the hole 11h and the projecting portion 11x is eliminated. The configuration and the shape of the frame 11A except for the above is similar to those of the frame 11, and the detailed description thereof is not repeated.

The portion of the frame 11A in which the side surface 11s (the frame side surface) is provided is hereinafter also referred to as "frame side surface portion." With reference to FIG. 7, the hole 11h is provided in the frame side surface portion of the frame 11A. In the Y-Z plane, the hole 11h is located at the same position as that of the hole 7h and the hole 9h.

The screw NJ2 is inserted into the holes 11h, 7h, and 9h such that the frame 11A is fixed to the frame 7 that is engaged with the frame 9. That is, the screw NJ2 fastens and fixes the frame 11A and the display apparatus 100A together.

As described above, according to the modification of this preferred embodiment, the fixing structure STb produces the effect similar to that of the fixing structure STa according to the first preferred embodiment.

<Second Preferred Embodiment>

According to the first preferred embodiment, the excellent dust resistance and water resistance have been provided through the use of the curable resin 31 applied to the groove V1 of the frame 11 and the screw NJ1 being the waterproof screw. According to this preferred embodiment, the following describes a configuration (hereinafter also referred to as "fixing structure STc") that further improves dust resistance and water resistance.

Figure 8:
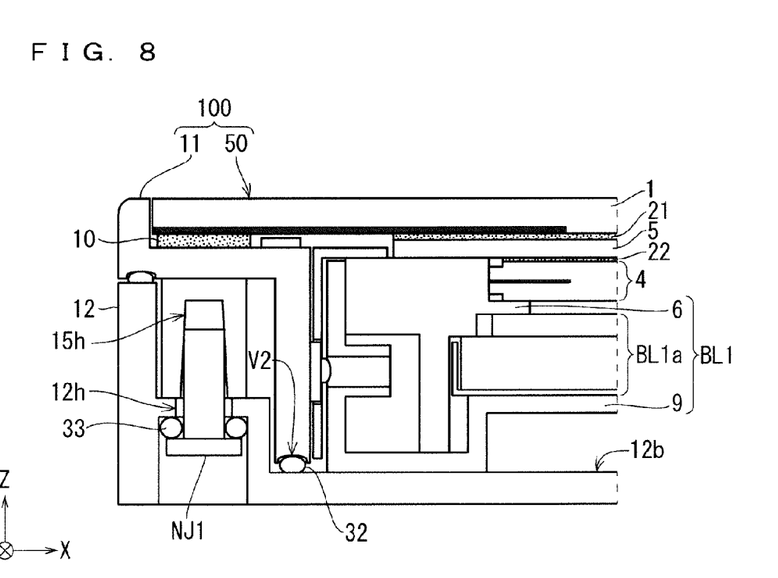
FIG. 8 is a cross-sectional view of the display apparatus having a fixing structure STc applied thereto according to a second preferred embodiment of the present invention.

According to this preferred embodiment, the following describes the configuration in which the fixing structure STc is applied to the display apparatus 100 according to the first preferred embodiment. FIG. 8 is a cross-sectional view of the display apparatus 100 having the fixing structure STc applied thereto according to a second preferred embodiment of the present invention. In the fixing structure STc, the frame 11 has a groove V2. The grove V2 is the groove for fixing the frame 11 to the housing 12 through a curable resin 32. The curable resin 32 is the member having the same properties as the curable resin 31.

In particular, the frame 11 has the groove V2 in its portion that is closest to an undersurface 12b of the housing 12. The frame 11 is fixed to the housing 12 through the curable resin 32 applied to the groove V2.

The fixing structure STc may have a ring 33 that covers the surrounding portion of the hole 12h of the housing 12. The ring 33 is, for example, an annular O ring. As shown in FIG. 8, the screw NJ1 is inserted into the hole 12h and the hole 15h with the ring 33 located therebetween. This can further improve dust resistance and water resistance. Moreover, the display apparatus 100 having the fixing structure STc applied thereto can be brought into compliance with the stricter specifications of water resistance.

In the present invention, the above preferred embodiments and the modifications thereof can be arbitrarily combined, or each preferred embodiment and each modification thereof can be appropriately varied or omitted within the scope of the invention.

For example, one or both of the display apparatus 100 according to the first preferred embodiment and the display apparatus 100A according to the modification of the first preferred embodiment may have a configuration (hereinafter referred to as "modified configuration B") that eliminates the protective member 1.

According to the modified configuration B, the touch panel 5 being the transparent member has, for example, the same size and the same shape as those of the protective member 1. According to the modified configuration B, the touch panel 5 is located in the area in which the protective member 1 has been originally located in FIG. 2. Consequently, the modified configuration B produces the same effect as that described above.

For example, the fixing structure STc is applicable to the display apparatus 100A according to the modification of the first preferred embodiment.

For example, it is only required that the minimum constituent components for the effects of the present invention are included in one or both of the display apparatus 100 according to the first preferred embodiment and the display apparatus 100A according to the modification of the first preferred embodiment.

For example, one or both of the frame 11 of the display apparatus 100 and the frame 11A of the display apparatus 100A may not have the projection X1.

For example, one or both of the frame 11 of the display apparatus 100 and the frame 11A of the display apparatus 100A may not have the groove V1.

For example, one or both of the frame 11 of the display apparatus 100 and the frame 11A of the display apparatus 100A may not have the rod-shaped portion 15 having the hole 15h.

For example, one or both of the frame 11 of the display apparatus 100 and the frame 11A of the display apparatus 100A may not have two or more of the projection X1, the groove V1, and the rod-shaped portion 15 being the constituent components.

While the invention has been shown and described in detail, the foregoing description is in all aspects illustrative and not restrictive. It is therefore understood that numerous modifications and variations can be devised without departing from the scope of the invention.

What is claimed is:

1. A display apparatus comprising:
a display module that displays a video; and
a first frame that holds said display module, wherein
said display module includes:
   a display panel that has a display surface on which said video is displayed;
   a second frame that holds said display panel; and
   a transparent member located on said display surface side of said display panel to cover said display surface of said display panel,
said first frame has:
   an opposing plane surface that is a plane surface opposed to a periphery of said transparent member; and
   a frame side surface that is a surface opposed to a side surface of said display module,
said opposing plane surface of said first frame is fixed to the periphery of said transparent member through a joining member,
said display apparatus has a fixing structure to fix said frame side surface of said first frame to the side surface of said display module,
said opposing plane surface of said first frame has a projection projecting toward said transparent member, and
said projection has a height that is smaller than a thickness of said joining member.

2. The display apparatus according to claim 1, wherein said first frame is made of resin or metal, and
said projection is formed through molding process.

3. The display apparatus according to claim 1, wherein said second frame has another frame side surface being the side surface of said display module,
said another frame side surface has a hole,
said frame side surface of said first frame has a projecting portion that is inserted into said hole, and said fixing structure is a structure to fix said first frame to said second frame by inserting said projecting portion into said hole.

4. The display apparatus according to claim 3, wherein
said first frame is made of resin, and
said projecting portion is formed through molding process.

5. The display apparatus according to claim 3, wherein
said first frame is made of metal, and
said projecting portion is formed through molding process.

6. A display apparatus comprising:
a display module that displays a video; and
a first frame that holds said display module, wherein
said display module includes:
  a display panel that has a display surface on which said video is displayed;
  a second frame that holds said display panel; and
  a transparent member located on said display surface side of said display panel to cover said display surface of said display panel,
said first frame has:
  an opposing plane surface that is a plane surface opposed to a periphery of said transparent member; and
  a frame side surface that is a surface opposed to a side surface of said display module,
said opposing plane surface of said first frame is fixed to the periphery of said transparent member through a joining member,
said display apparatus has a fixing structure to fix said frame side surface of said first frame to the side surface of said display module,
said second frame has another frame side surface being the side surface of said display module,
said another frame side surface has a hole,
said frame side surface of said first frame has a projecting portion that is inserted into said hole,
said fixing structure is a structure to fix said first frame to said second frame by inserting said projecting portion into said hole, and
said projecting portion is composed of a first member having a cylindrical shape and a second member having a cylindrical shape that is located on said first member.

7. The display apparatus according to claim 6, wherein a thickness of said first member is equal to a thickness of a portion of said second frame in which said hole is provided.

8. The display apparatus according to claim 1, wherein
said first frame has a first hole,
said second frame has a second hole, and
said fixing structure is a structure to fix said first frame to said second frame by inserting a screw into said first hole and said second hole.

9. A display apparatus comprising:
a display module that displays a video; and
a first frame that holds said display module, wherein
said display module includes:
  a display panel that has a display surface on which said video is displayed;
  a second frame that holds said display panel; and
  a transparent member located on said display surface side of said display panel to cover said display surface of said display panel,
said first frame has:
  an opposing plane surface that is a plane surface opposed to a periphery of said transparent member; and
  a frame side surface that is a surface opposed to a side surface of said display module,
said opposing plane surface of said first frame is fixed to the periphery of said transparent member through a joining member,
said display apparatus has a fixing structure to fix said frame side surface of said first frame to the side surface of said display module,
said first frame includes a rod-shaped portion located on a surface opposite to said opposing plane surface, and
said rod-shaped portion has a hole into which a screw is inserted to fix said first frame to an exterior housing.

10. A display apparatus comprising:
a display module that displays a video; and
a first frame that holds said display module, wherein
said display module includes:
  a display panel that has a display surface on which said video is displayed;
  a second frame that holds said display panel; and
  a transparent member located on said display surface side of said display panel to cover said display surface of said display panel,
said first frame has:
  an opposing plane surface that is a plane surface opposed to a periphery of said transparent member; and
  a frame side surface that is a surface opposed to a side surface of said display module,
said opposing plane surface of said first frame is fixed to the periphery of said transparent member through a joining member,
said display apparatus has a fixing structure to fix said frame side surface of said first frame to the side surface of said display module,
a surface of said first frame opposite to said opposing plane surface has a groove for fixing said first frame to an exterior housing through a curable resin, and
said first frame is fixed to said housing through said curable resin applied to said groove.

11. The display apparatus according to claim 1, wherein
said first frame has a groove for fixing said first frame to an exterior housing through a curable resin, and
said first frame is fixed to said housing through said curable resin applied to said groove.

* * * * *